United States Patent [19]
Thoenen

[11] 3,795,212
[45] Mar. 5, 1974

[54] METHOD FOR FABRICATING A FLUID SPREADER

[75] Inventor: Earl R. Thoenen, Newburyport, Mass.

[73] Assignee: Polaroid Corporation, Cambridge, Mass.

[22] Filed: Jan. 2, 1973

[21] Appl. No.: 320,584

Related U.S. Application Data

[62] Division of Ser. No. 133,905, April 14, 1971, Pat. No. 3,735,690.

[52] U.S. Cl. .............................. 113/116 R, 95/13
[51] Int. Cl. ............................................ B21d 53/36
[58] Field of Search ........... 113/116 R; 95/13, 89 R

[56] References Cited
UNITED STATES PATENTS
481,207   8/1892   Smith............................ 113/116 R
3,641,908  2/1972   Eloranta ............................. 95/13

*Primary Examiner*—Richard J. Herbst

[57] ABSTRACT

A method of fabricating a fluid spreader for use in a camera of the self-developing type to effect the spreading of a processing fluid in a layer between a pair of superposed sheet materials as they progressively pass through the apparatus. A first spreader element is formed of sheet metal and includes a flat sheet-contacting facing surface and a canted platform extending in advance thereof. A second spreader element is formed of sheet metal and includes an arcuate sheet-contacting facing surface and a pair of wrap-around collars comprising extensions of that sheet metal structure curled back in the direction of its arcuate facing surface. In manufacturing the latter mentioned spreader element, the wrap-around collars are formed subsequent to the development of its arcuate sheet-contacting facing surface and are adapted to engage respective longitudinal edges of the sheet materials and bias them toward the aforementioned platform to preclude fluid escaping from between the edges of the sheet materials.

3 Claims, 8 Drawing Figures

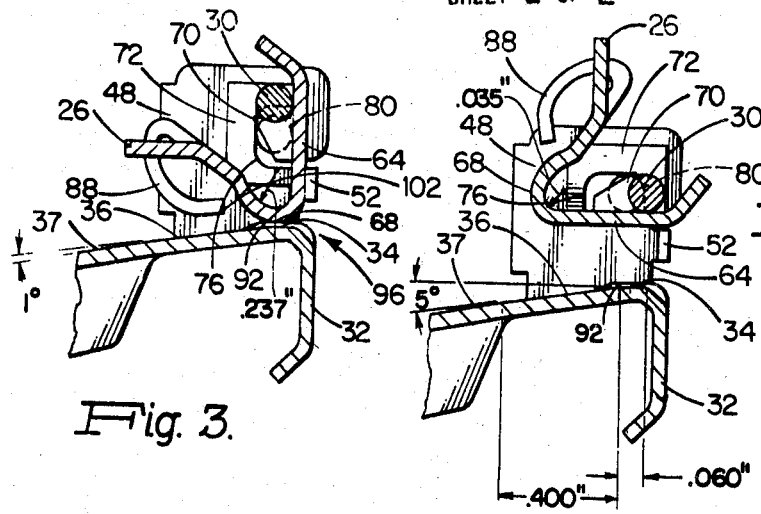
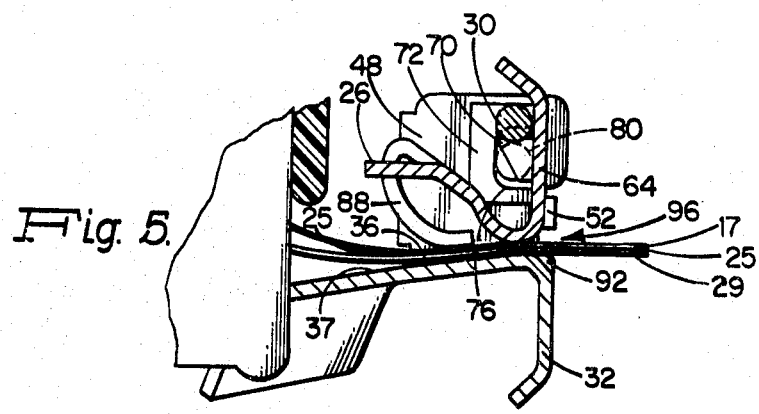
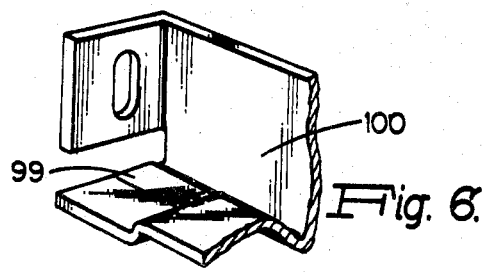
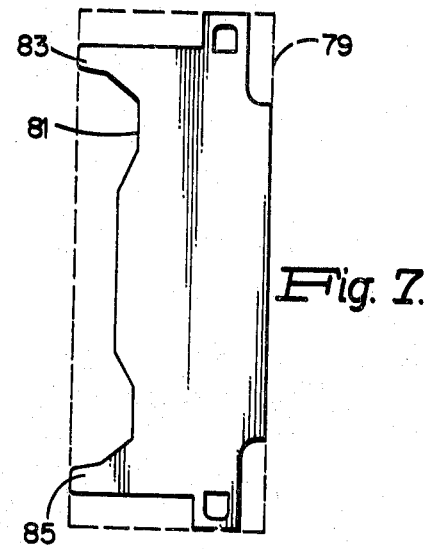
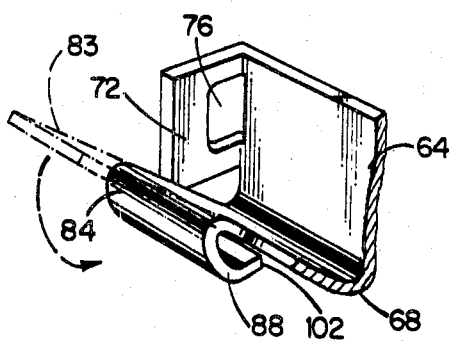

METHOD FOR FABRICATING A FLUID SPREADER

CROSS REFERENCE TO RELATED APPLICATION

This application is a division of application Ser. No. 133,905 filed Apr. 14, 1971, U.S. Patent No. 3,735,690.

BACKGROUND OF THE INVENTION

1. Field of the Invention

This invention relates to a method of fabricating a fluid spreader for distributing processing fluid in a layer between a pair of superposed sheet materials.

2. Description of the Prior Art

Cameras of the self-developing type generally employ a pair of spreader elements which facilitate the formation of a visible image in a photographic sheet by a diffusion-transfer process. In a typical arrangement, a sheet of photosensitive material is first exposed to image-carrying light rays to form a latent image therein. This sheet is subsequently progressively pressed against an image-receiving sheet with a predetermined quantity of a viscous processing fluid being disposed therebetween. In this respect, the fluid may initially be releasably stored in a rupturable pod or container attached to one of the photographic sheets. As the assembly, comprising such sheets and pod, is advanced between a pair of spreader elements, those members exert a compressive force thereon that first ruptures the pod and subsequently spreads the fluid released therefrom as a layer between the superposed sheets. The spreader elements themselves may typically comprise either a pair of rollers, one roller and a rigid non-rolling member, or a pair of rigid non-rolling members.

The fluid spreading process is a critical consideration in producing high-quality photographic prints by a diffusion-transfer process. Much effort was required to develop, engineer and manufacture the film units and spreader elements employed in the self-developing cameras currently being marketed. The quality of the finished print provided by these photographic systems is directly related to the nature of the fluid coating applied to the photographic sheets. As is well known, such cameras are capable of producing photographic prints generally most pleasing to the public. However, it is of the utmost importance that the sheet-containing facing surfaces of the spreader elements be accurately formed to close tolerances.

In order to reach the mass amateur camera market, it is necessary that the cost of self-developing cameras by kept to an absolute minimum. More specifically, a major goal in the self-developing camera art is the development of a camera which can be marketed at substantially the same price as a conventional-type camera of the same quality. This not a simple task when one realizes that such cameras must perform all of the functions of the more conventional-type cameras, and additionally include a film processing capability.

Along these lines, experience has shown that the fluid spreading apparatus necessarily incorporated in self-developing cameras represents a significant cost element. Until recently, in commercially available systems, this apparatus traditionally comprised a pair of precision machined stainless steel rollers and a mounting arrangement therefor which facilitated their proper operation and frequent cleaning. In order to provide a lower-cost fluid spreading apparatus for its "Big Swinger" and "Color Pack" cameras which are produced for the very moderately priced amateur market, th Polaroid Corporation of Cambridge, Masschusetts developed the spreader system described in detail in U.S. Pat. Nos. 3,485,155; 3,499,373; 3,498,196 and 3,537,371. This apparatus comprises a pair of relatively inexpensive non-rolling fluid spreader members formed of sheet metal parts. As is well known, millions of these "Big Swinger" and "Color Pack" cameras have already been sold utilizing this particular low-cost fluid spreading system. It is self-evident that photographs produced employing such apparatus have proven quite satisfactory. However, the ultimate goal still exists, i.e., the development of a fluid spreading system of absolute minimum cost which does not compromise the quality of the photographs furnished to the user. Recently more simplified spreading systems have been developed comprising spreader members formed of sheet metal parts. Such a system is described in U. S. Pat. No. 3,641,908.

In fluid spreading systems of these types, means are provided for precluding the processing fluid escaping from between respective longitudinal edges of the superpositioned sheet materials in advance of the pressure-generating gap defined by the juxtaposed sheet-contacting facing surfaces. In each instance, at least one of these sheet-contacting facing surfaces is arcuate in cross-sectional configuration. Referring to the simplified fluid spreader system described in the aforementioned U. S. Pat. No. 3,641,908, it will be seen that its edge control members, i.e., the members which serve to preclude fluid escaping from between the edges of the sheet materials, are formed in the same sheet metal part in which one of its relatively small radius arcuate facing surfaces is provided. In forming that particular spreader member, the arcuate facing surface is developed and then the edge control members are formed by a metal stamping operation. It will be apparent that considerable control must be exerted to preclude undesirable distortion of tthe arcuate facing surface during the edge control forming step. In mass production operations, it has been found that the stamping process ocassionally causes the arcuate facing surface to distort, resulting in a certain amount of "scrappage" significantly increasing the cost of the acceptable units.

An object of this invention, therefore, is to provide a method of fabricating a fluid spreader for spreading a processing fluid as a layer between sheets of material.

Another object of this invention is to provide a fluid spreading apparatus which may be produced in quantity production operation at low cost.

An additional object of this invention is to provide a method of fabricating a fluid spreader in which minimal stresses are developed in an arcuate sheet-contacting facing surface in the course of forming its edge control members.

SUMMARY OF THE INVENTION

In its illustrated embodiment, the fluid spreading apparatus fabricated by the instant invention has been depicted as being employed to effect the distribution of a processing fluid in a layer between a pair of photographic sheets in a camera of the self-developing type. The fluid spreading apparatus itself is an integral assembly which may be inserted into and removed from the camera as a single unit. It comprises a pair of sheet metal spreader elements presenting elongated juxtaposed sheet-contacting facing surfaces disposed to exert a compressive force on the pair of photographic sheets as they progressively pass therebetween. One of such sheet-contacting facing surfaces is substantially flat, while the other has a relatively large radius arcuate cross-sectional configuration. Each facing surface has a uniform cross-sectional configuration extending entirely across the sheet metal structure in which it is formed.

A canted platform is connected to the flat facing surface in advance of the pressure-generating gap defined by the juxtaposed facing surfaces, while a pair of edge control members are formed of the same sheet metal part comprising the arcuate facing surface. Most importantly, these edge control members comprise spaced apart extensions of the sheet metal structure in which they are formed, curled back toward that structure in the direction of its arcuate facing surface and serve to urge respective longitudinal edges of the superposed sheet materials toward the aforementioned platform in advance of the pressure-generating gap. The nature of these "wrap-around collars" is such that they may be formed after the arcuate sheet-contacting facing surface has been developed with minimal stresses being established in that facing surface.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 3 is a fragmentary sectional view taken generally along line 3—3 of FIG. 2 illustrating the spreader elements at such time as they are disposed in their operative positions;

FIG. 4 is a view similar to FIG. 3 illustrating the spreader elements at such time as they are disposed in their inoperative positions;

FIG. 5 is a view similar to FIG. 3 illustrating a film unit being advanced through the spreader elements;

FIG. 6 is a fragmentary diagrammatic perspective view illustrating the nature of an edge control member formed on a prior art fluid spreader element;

FIG. 7 is a diagrammatic plan view illustrating a step in the method of forming the fluid spreader element comprising the present invention; and FIG. 8 is a fragmentary diagrammatic perspective view illustrating the nature of the edge control members of the present invention and a step in the method of forming same.

DESCRIPTION OF A PREFERRED EMBODIMENT

In its illustrated embodiment, the spreader assembly fabricated by the method of the present invention is depicted as forming part of a self-developing camera 10.

Figure 1:
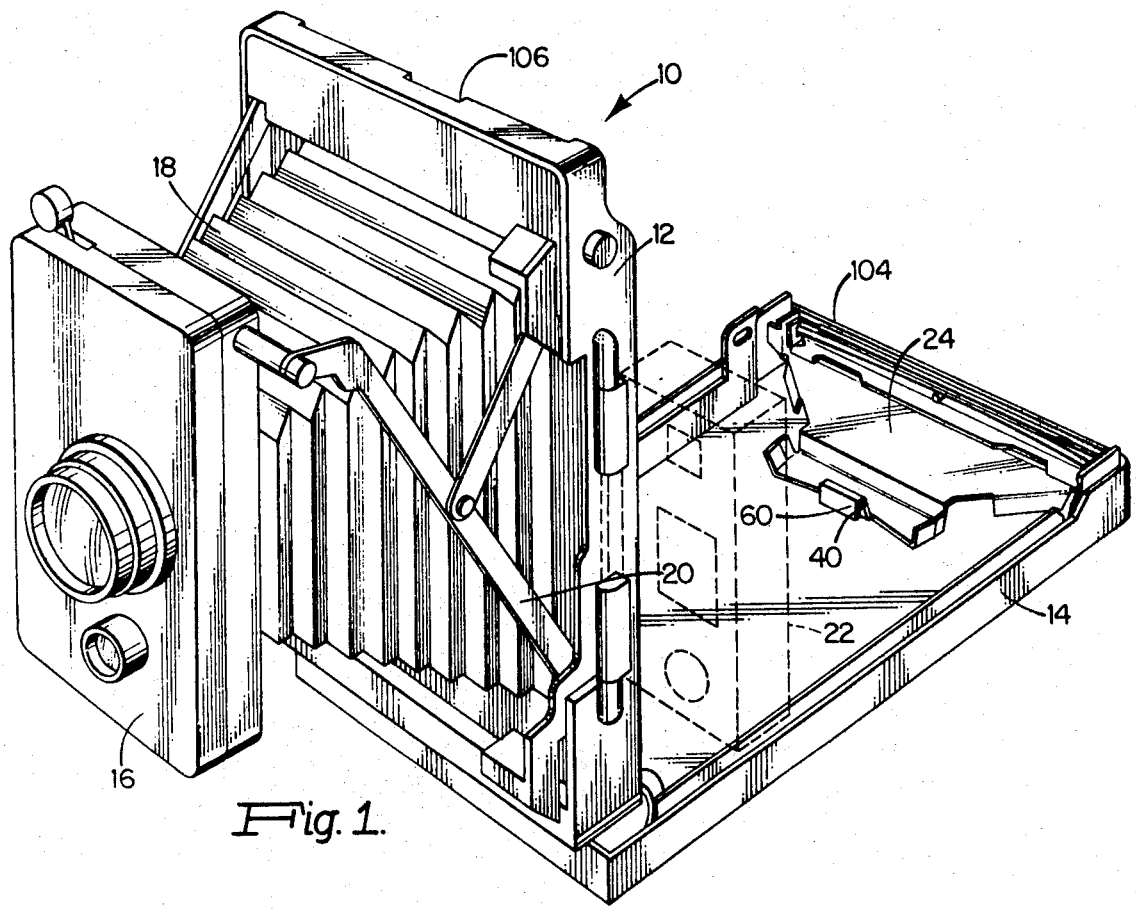
FIG. 1 is a diagrammatic perspective view of a self-developing camera employing fluid spreading apparatus embodying features of this invention.

As shown in FIG. 1, this camera 10 is basically constituted by a main camera body 12 to which a back body member 14 is pivotally connected. When the back body member 14 is disposed in its open position with respect to the main camera body 12, access is provided into the interior of the camera 10 for purposes of loading the camera with a film pack (not shown) containing a sufficient quantity of photographic materials to produce a plurality of reflective photographic prints. These film packs may, for example, be identical to those currently marketed by Polaroid Corporation of Cambridge, Massachusetts, and identified as Land Pack Film Type 107 (black-and-white film) or Polacolor Land Film Type 108 (full-color film). Each of these particular film packs contains a plurality of eight film units. In order to produce a reflective print, each such film unit includes a relatively thick, stiff sheet of image-receiving material 17 (See FIG. 5); a relatively thin, flexible sheet of photosensitive image recording material 29; and certain components not illustrated in the drawing such as a mask, a rupturable pod of processing fluid 25, a bib and a leader.

Forming part of the main camera body 12 is a lens and shutter housing 16 which may take a conventional form. This housing 15 is mounted at the outer end of an extensible bellows 18 provided with a suitable erecting mechanism 20. Attached at one side of the main camera body 12 is a rangefinder-viewfinder 22 that has been shown in phantom so as not to obstruct the view of certain other portions of the camera 10. A processing fluid spreading device or apparatus 24, fabricated by the method of the present invention, is removably retained within the back body member 14 adjacent its free end. After the film pack has been loaded into the camera 10, the camera's back body member 14 may be pivoted to its closed position wherein it cooperates with the main camera body 12 to form a light-sealed chamber adapted to facilitate film exposure and processing operations.

Reference is now made to FIGS. 2–5 of the drawings which more clearly depict the nature of the processing fluid spreading device 24. As shown therein, this device 24 basically comprises three components, i.e., a first spreader element 26, a second spreader element 28, and an elongated rod 30, the last-mentioned component serving, in part, to pivotally connect the first two stated elements one to the other. Each of the spreader elements 26 and 28 may, for instance, advantageously be fabricated from a single sheet of metal, such as stainless steel, in relatively inexpensive metal-forming operations. Typically, the sheet metal piece may have a thickness on the order of .025 inches.

The spreader element 28 includes a flat section 32 from which a flat sheet-containing facing surface 34 depends at approximately a 90° angle. While the facing surface 34 is described as being substantially flat, within this context it is contemplated that it may comprise slight contours. For instance, in the preferred embodiment, this substantially flat surface 34 is provided with a convex profile contour such that its center point is on the order of .0008 inches above its ends. Extending rearwardly from this flat sheet-contacting facing surface 34, in a direction away from the first spreader element 26, is a platform 36. A ramp 37 extends at an angle from the platform 36 and serves to support and guide the leaders (not shown) and image-receiving sheets 17 of film units as they are advanced from the aforementioned film pack towards the platform 36 and sheet-contacting facing surface 34. A support 38, provided with an upturned flange 40, is formed at the end of the ramp 37 furthermost disposed from the sheet-contacting facing surface 34. Extending upwardly from the opposite ends of the flat facing surface 34 are a pair of flanges 48 and 50 respectively provided with inwardly directed tabs 52 and 54 and outwardly depending tabs 56 and 58. When the fluid spreading device 24 is inserted in the camera 10 and seated against the camera's back body member 14, the upturned flange 40 extending from the support 38 is engaged by a clip 60 (See FIG. 1) of the camera's back body member 14 that serves to releasably retain the device 24 in the camera. In this connection, when the camera 10 is loaded with one of the aforementioned film packs and its back body member 14 is closed against the camera's main body 12, members (not shown) formed on the main camera body 12 engage the tabs 56 and 58 of the spreading device 24 to further restrict or limit movement of that device within the camera 10. Simultaneously, these tabs 56 and 58 serve to align the spreading device 24 laterally within the back body member 14.

The first spreader element 25 includes a flat section 64 from which a section 66 extends to define a relatively large radius arcuate sheet-contacting surface 68. Also extending from the same side of the flat section 64 is a pin 70 positioned midway between the ends of the spreader element 26. The lateral ends of the section 64 respectively terminate in ears 72 and 74 provided with elongated apertures 76 and 78. In order to pivotally connect the spreader elements 26 and 28 one to the other, the elongated apertures 76 and 78 of the first spreader elements are first respectively aligned with circular apertures 80 and 82 of the second spreader element's flanges 48 and 50. Then the elongated rod 30 is slid through these apertures 76, 78, 80 and 82 so that its center portion is disposed on the side of the pin 70 furthermost removed from the spreader element 28. It will thus be appreciated that the spreader element 26 may be pivoted with respect to the spreader element 28 between an operative position as shown in FIG. 3 of the drawings and an inoperative position as shown in FIG. 4.

When the spreader elements 26 and 28 are disposed in their inoperative positions illustrated in FIG. 4, their sheet-contacting facing surfaces 34 and 68 are readily accessible for inspection and/or cleaning purposes. When these spreader elements 26 and 28 are disposed in their operative positions illustrated in FIG. 3, opposite ends of the arcuate sheet-contacting facing surface 68 are seated on spacers 92 and 94 appropriately provided on the flat sheet-containing facing surface 34. The section 66 of the spreader element 26 terminates in specially configured end portions 84 and 86 which respectively include edge control members, or wrap-around collars, 88 and 90. Importantly, it will be noted that the substantially flat sheet-contacting surface 34 and arcuate sheet-contacting surface 68 have substantially uniform cross-section configurations extending entirely across the piece of sheet metal in which they are formed. This invention is particularly concerned with the nature of these sheet-contacting facing surfaces 34 and 36 and the collars 88 and 90, which features will be discussed in more detail hereinafter.

As the spreader elements 26 and 28 reach their operative positions, the spacers 92 and 94 establish a predetermined minimum spacing between their respective facing surfaces 34 and 68. Also, when the spreader elements 26 and 28 are disposed in their operative positions, the collars 88 and 90 are in close proximity to the platform 36 of spreader element 28. In this connection, the rod 30 is stressed or bowed over the pin 70 and the configuration of the elongated apertures 76 and 78, in which the opposite ends of the rod are positioned, permits a certain amount of movement of the spreader element 26 in the direction away from the spreader element 28. Thus, at such times, the facing surfaces 34 and 68 define a pressure-generating gap 96 between the spreader elements 26 and 28, such gap having a minimum dimension as determined by the spacers 92 and 94. It will be recognized that this arrangement facilitates the introduction of materials of varying thicknesses between the facing surface 34 and 68, which surfaces may thereafter exert a compressive force on such materials under the influence of the flexible rod 30. The wrap-around collars respective longitudinal edge portions of a film unit being advanced through the pressure-generating gap 96 in advance of the gap to preclude escape of processing fluid from between the sheet materials 17 and 29 comprising such film unit.

Additionally, these collars 88 and 90 serve in a manner similar to the edge control members disclosed in copending U.S. Pat. application Ser. No. 837,422 entitled "Four Element Sheet metal Spreader" by Vaito K. Eloranta filed on June 30, 1969, now U.S. Pt. No. 3,641,908 to smooth out the pull forces required to advance the superposed sheet materials through the fluid spreading apparatus. More specifically, in the last stated context, these collars 88 and 90 are configured such that, when contacted by increased thicknesses of materials advancing towards the pressure-generating gap 96, they cause the spreader element 26 to "rock" a limited amount on its pivot, i.e., rod 30.

When the processing fluid spreading device 24 is mounted in the camera's back body member 14 with its spreader elements 26 and 28 disposed in their operative positions, the pressure-generating gap 96 defined by the facing surfaces 34 and 68 is aligned with an elongated exit port (not shown) formed through the adjacent wall 104 (See FIG. 1) of the back body member. Also, when the back body member 14 is closed against the main camera body 12, the edge of the wall 104, in conjunction with a slotted section 106 of the main camera body 12, provides additonal access into the camera 10.

As is well known, when a film pack of the type indicated is mounted in the camera 10 and the back body member 14 thereof closed thereover, tabs (not shown) attached to the film units extend through the opening provided by the slotted section 106. By drawing on one of thes tabs, after making an exposure, a leader attached to the associated film unit is advanced into the pressure-generating gap 96 of the fluid spreading device 24 so as to protrude through the aforementioned adjacent elongated exit port (not shown) of the camera's back body member 14. Once the leader is accessible to the operator, it may be withdrawn from the camera 10 to advance the film unit, comprising the exposed image-recording sheet 29, and its associated image-receiving sheet 17 and rupturable pod (not shown) of processing fluid 25, through the pressure-generating gap 96 of the fluid spreading device 24. During such operation, the pod is ruptured and the processing fluid initially retained therein spread by the elements 26 and 28 in a thin layer between the photographic sheets 17 and 29.

As previously indicated, the fluid spreading device 24 of this invention has been depicted as being utilized in a camera adapted to receive certain film packs of a type presently marketed by Polaroid Corporation of Cambridge, Massachusetts. Further, certain dimensions have been indicated on several figures of the drawings in order to impart a full understanding of the present invention. However, it is to be expressly understood that the invention is adapted for use with other types of film packs and/or film units and that the dimensions reflected on the drawings are exemplary only and therefore are not to be interpreted as restricting the scope of the disclosed invention in any manner.

Certain of the unique features of the fluid spreading device 24 are the subject of the copending U.S.Pat. application Ser. No. 133,906 entitled "Low-Cost Photographic Fluid Spreading Apparatus" by Earl R. Thoenen and Sheldon D. Powers filed on even date herewith. These include the use of a pair of sheet metal spreader elements pivotally connected together for resilient movement away from each other, one such element having an arcuate sheet-contacting facing surface and the other such element having a substantially flat sheet-contacting facing surface, and the use of the canted platform 36. The former of these features permits the facing surfaces to be formed in relatively low tolerance manufacturing operations, thereby reducing the cost of the fluid spreading device. Also, that same feature provides a "flattened" fluid meniscus pattern during film processing operations in comparison to the fluid meniscus pattern developed with, for instance, the fluid spreading devices described in the aforementioned U.S. patents. It will be appreciated that, as the fluid meniscus is "flattened," the amount of excess fluid which must be provided for each film unit is proportionately reduced and the size of the arrangement associated with each film unit for trapping such excess fluid is similarly proportionately reduced.

The latter mentioned feature, i.e., the canted platform 36, facilitates control of the thickness of the layer of processing fluid 25 spread between the superposed sheets 17 and 29 as they pass through the pressure-generating gap 96. For example, when this angle is selected at 4 percent the thickness of the fluid layer would be on the order of .0060 inches, and when this angle is selected at 6° the thickness of the fluid layer will be on the order of .0056 inches. Additionally, this canted platform 36 assures that fluid layers of the same thickness are spread between the sheets 17 and 29 of all of the film units within each film pack and precludes both undesirable contact between the rupturable pod (not shown) and other components of the camera 10 and undesirable misalignment between the leader and bib of each film unit and the rupturable seal of its rupturable pod as that pod distends during its introduction between the sheet-contacting facing surfaces 34 and 68 of the fluid spreading device 24.

By way of example, it has been determined that satisfactory pod rupturing and fluid spreading operations may be effected employing the specific fluid spreader elements 26 and 28 illustrated in the drawings in conjunction with the film units of the aforementioned Polaroid Corporation film packs when the elongated rod 30 is selected to have a spring force on the order of 5–6 pounds. In this particular arrangement, the spreader elements 26 and 28 exert a compressive force on the film units on the order of 1.0 psi.

As indicated, the fluid spreader element 26, with the exception of its pin 70, comprises an integral piece of sheet metal which, for instance, may have a thickness on the order of .025 inches. Thus it may be formed into its final configuration by conventional sheet metal working operations. Preferably, in this connection, a substantially flat piece of sheet metal 79 (See FIG. 7) is cut in a stamping operation into a predetermined pattern 81 comprising a pair of spaced apart extensions 83 and 85. These extensions 83 and 85 are adapted to respectively comprise the wrap-around collars 88 and 90 when the sheet metal pattern 81 has been formed into its final configuration, i.e., the spreader element 26. All of the other metal forming operations associated with the production of the spreader element 26 may be advantageously performed in a progressive die. Because of the cross-sectional configuration of the spreader element 26, efficient manufacturing operations dictate that the final bending operation associated with the formation of the wrap-around collars 88 and 90 be performed subsequent to the development of the arcuate sheet-contacting facing surface 68. In fact, in the preferred process, the final step associated with the production of the spreader element 28 is the curling back of the extensions 83 and 85 toward the sheet metal structure to respectively form an S-shaped surface having the wrap-around collars 88 and 90 (See FIG. 8). It will be recognized by those skilled in the art that these last stated operations may readily be performed without developing stresses in the facing surface 68 such as would effect a distortion of that surface. In this connection, this operation contrasts significantly with the stamping operation required to form the edge control members 99 of the spreader element 100 described in U.S. Pat. No. 3,641,908 and depicted in FIG. 6.

Figure 2:
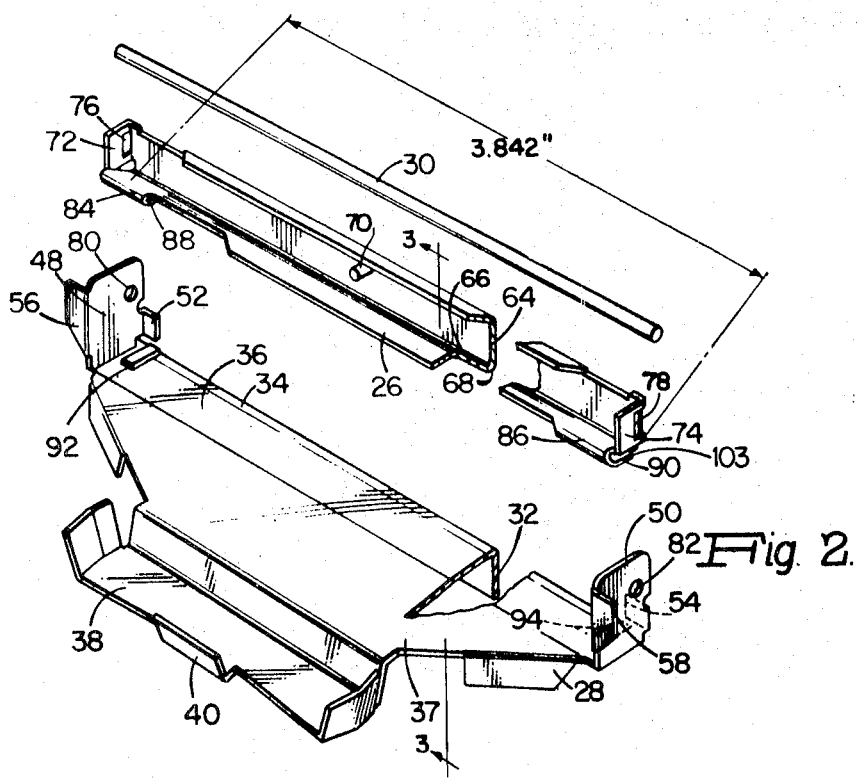
FIG. 2 is an exploded diagrammatic perspective view of the fluid spreading apparatus employed in the camera illustrated in FIG. 1.

Referring now to FIGS. 2 and 3 it will be noted that the ends 102 and 103, respectively, of the wrap-around collars 88 and 90 are spaced a small distance from the adjacent sections of the fluid spreader element 26. This spacing may be on the order of .025 inches. Additionally, when the fluid spreader elements 26 and 28 are in their operative positions, the wrap-around collars 88 andd 90 are spaced a predetermined distance from the platform 36. This latter arrangement facilitates the initial introduction of the superposed leader and mask (not shown) associated with the photographic sheets 17 and 29 of each film unit between the collars 88 and 90 and the platform 36 as it is advanced into the pressure-generating gap 96.

It has been found desirable to have the lowermost portions of the collars 88 and 90 aligned with the edge of the arcuate facing surface 68, i.e., to have those portions of the collars and the arcuate facing surface define a plane disposed parallel to the flat facing surface 34 when the elements 26 and 28 are in their operative positions. The portion of the canted platform disposed adjacent those portions of the collars at such time must be spaced therefrom a carefully predetermined distance which, in the preferred embodiment, is on the order of .022 inches. The spacing thus provided is greater than the combined thicknesses of the photographic sheets 17 and 29, the mask and rails (not shown) of the film units. These considerations define the locations at which the canted platform intersects th substantially flat sheet-contacting facing surface 34 and, in the illustrated embodiment provides a facing surface 34 having a length of .060 inches.

To facilitate production operations, it is desiragle that the canted platform extend in a direction away from the flat facing surface 34 at least to the end of the ears 72 and 74 which is the situation depicted in FIG. 2. By way of example, satisfactory results are then obtained when the ramp 37 depends at an angle on the order of 1° from the canted platform 36. This situation provides a canted platform having a length on the order of .400 inches in the illustrated embodiment.

Of particular significance is the fact that the sheet-contacting facing surfaces 34 and 68 are substantially uniform in cross-sectional configuration and that each extends entirely across the sheet metal structure in which it is formed. In this context, the fluid spreading apparatus 24 of the present invention contrasts markedly with the similar apparatus described in the aforementioned U. S. Pat. No. 3,641,908. Most advantageously, the close tolerance facing surfaces 34 and 68 of the spreading device 24 are thus more readily produced or developed than those of heretofore devised sheet metal spreading devices. In this respect, it will be appreciated, in sheet metal spreading devices wherein edge control members or other features are formed adjacent a facing surface in a metal deforming process, considerably stresses are developed in the facing surface itself. Such stresses can frequently cause undesirable distortions to occur in the facing surface. The present arrangement materially reduces the amount of "scrappage" associated with the production of satisfactory fluid spreading devices 24 in large quantities as compared to the amount of "scrappage" experienced during high volume manufacturing operations for producing prior art sheet metal fluid spreading devices.

Those familiar with the self processing photographic arts will readily appreciate the novel and highly unique advantages of this invention. Most important, a relatively simple and effective processing fluid spreading device is provided which may be readily produced in high volume, low "scrappage", and therefore inexpensive, manufacturing operations.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A method of fabricating a fluid spreader element from a piece of sheet metal comprising the steps of:
   cutting said piece of sheet metal into a predetermined pattern comprising a pair of spaced apart extensions;
   bending said piece of sheet metal in a first direction to develop therein an elongated sheet-contacting facing surface disposed transverse said spaced apart extensions; and
   curling said extensions in a second direction generally opposite said first direction back toward said piece of sheet metal in the direction of said facing surface to form a generally S-shaped surface having a pair of spaced apart wrap-around collars to serve as edge control members.

2. The method of claim 1 wherein in the process of said bending step said elongated sheet-contacting facing surface is formed with an arcuate cross-sectional configuration.

3. The method of claim 1 wherein in the process of said bending step said elongated sheet-contacting facing surface is formed with a substantially uniform cross-sectional configuration extending across the entire said piece of sheet metal.

* * * * *